(12) United States Patent
Cole et al.

(10) Patent No.: US 8,719,641 B2
(45) Date of Patent: May 6, 2014

(54) PRIORITY BUFFERING FOR TRACE DATA IN TRACE QUEUE

(75) Inventors: Gary L. Cole, Endicott, NY (US); Michael J. Howland, Endicott, NY (US); Paul E. Rogers, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 13/217,590

(22) Filed: Aug. 25, 2011

(65) Prior Publication Data

US 2013/0055032 A1 Feb. 28, 2013

(51) Int. Cl.
*G06F 11/00* (2006.01)

(52) U.S. Cl.
USPC ............................................................ 714/45

(58) Field of Classification Search
USPC ........................................................ 714/45
See application file for complete search history.

(56) References Cited

U.S. PATENT DOCUMENTS

| | | | | |
|---|---|---|---|---|
| 7,003,699 | B2* | 2/2006 | Swaine et al. | 714/30 |
| 7,047,451 | B2* | 5/2006 | Agarwala et al. | 714/45 |
| 7,143,205 | B2* | 11/2006 | Sakugawa | 710/22 |
| 7,219,333 | B2* | 5/2007 | Agarwala et al. | 717/128 |
| 7,457,739 | B2* | 11/2008 | Agarwala et al. | 703/23 |
| 7,493,598 | B1 | 2/2009 | Craggs | |
| 2006/0129999 | A1* | 6/2006 | Hiraoka et al. | 717/128 |
| 2006/0294426 | A1* | 12/2006 | Agarwala et al. | 714/30 |
| 2011/0202801 | A1* | 8/2011 | Horley et al. | 714/45 |

* cited by examiner

*Primary Examiner* — Charles Ehne
(74) *Attorney, Agent, or Firm* — Cantor Colburn LLP; Dennis Jung

(57) ABSTRACT

A method for priority buffering of trace data in a computing system includes receiving instances of trace data by a priority assignment module, the trace data being generated by events that occur during execution of computer software in the computing system; assigning a priority to each instance of trace data, wherein the priority is assigned based on the event that generated the instance of trace data; and inserting the instances of trace data into a plurality of priority buffers based on their respective assigned priorities.

17 Claims, 5 Drawing Sheets

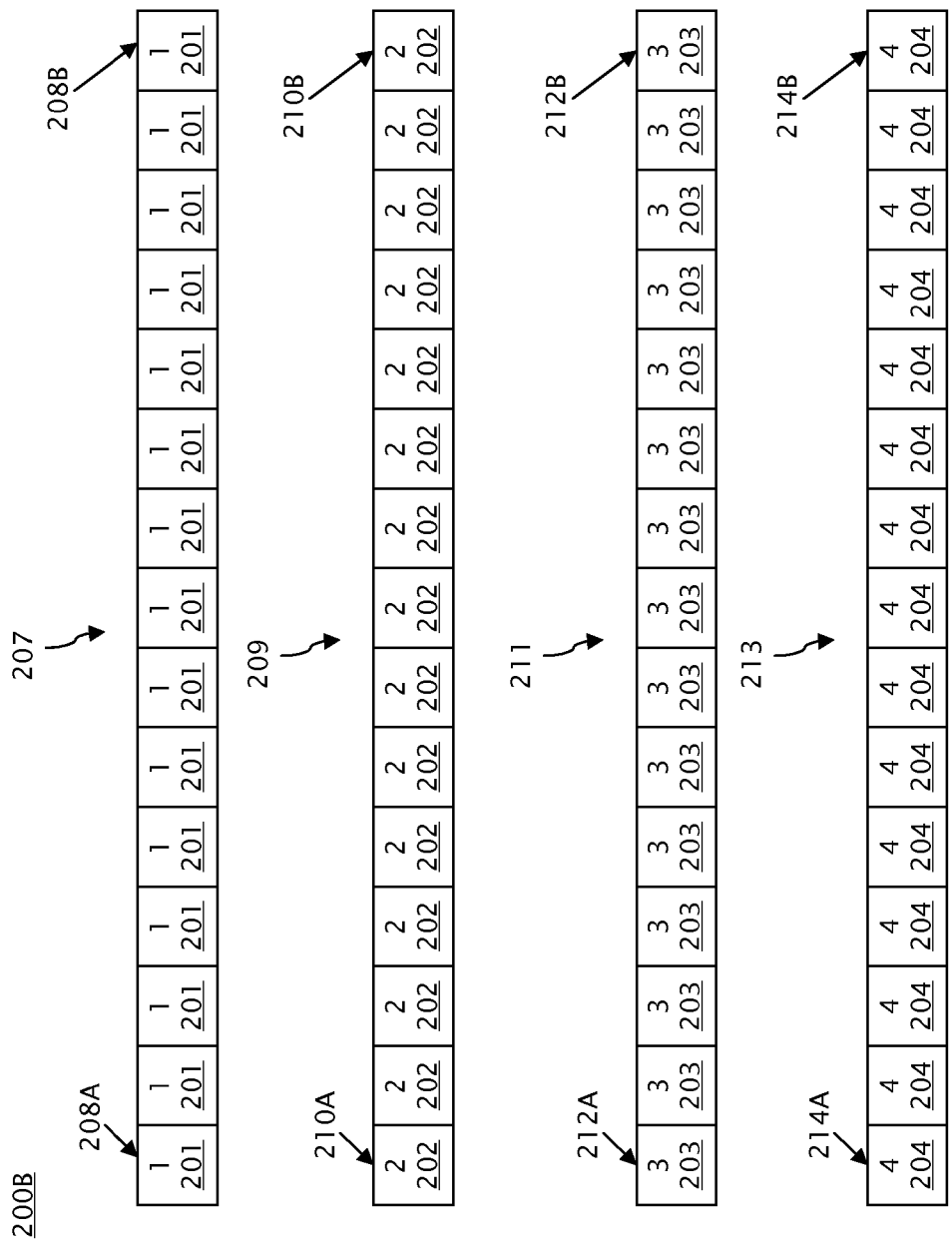

PRIORITY BUFFERING FOR TRACE DATA IN TRACE QUEUE

BACKGROUND

This disclosure relates generally to the field of computing systems, and more particularly to a trace queue for storage of trace data that is generated during execution of computer software on a computing system.

During execution of computer software on a computing system, trace data is generated at various trace points located in the software. Some trace data relates to events that occur during the normal execution of the software, and other trace data is generated in the event an error occurs during execution of the software. When an error occurs during execution of the computer software, the trace data that was generated during execution of the software is examined to determine the source of the error. In order to allow examination of the trace data to determine the source of an error, the trace data is collected and stored on a storage device in the computing system. Trace data may be stored in a trace queue comprising a fixed size first-in-first-out (FIFO) buffer. At any given time, such a trace queue contains the most recently entered trace data, with the oldest trace data being overwritten as new trace data is generated during the execution of the computer software.

In large software systems that run on computer systems comprising numerous internal or external devices, numerous trace points are needed; hence, a large volume of trace data may be generated during execution of such a software system. Because the amount of space available for the trace queue may be fixed or limited, older trace data is overwritten by newer trace data when the space allocated for the trace data is full. However, the older overwritten trace data may be needed to complete debugging and error detection tasks, for example, in cases when the execution of a complex software system is monitored for a relatively long period of time to precisely determine the causes of errors in the execution of the software system.

BRIEF SUMMARY

In one aspect, a method for priority buffering of trace data in a computing system includes receiving instances of trace data by a priority assignment module, the trace data being generated by events that occur during execution of computer software in the computing system; assigning a priority to each instance of trace data, wherein the priority is assigned based on the event that generated the instance of trace data; and inserting the instances of trace data into a plurality of priority buffers based on their respective assigned priorities.

In another aspect, a computer program product comprising a computer readable storage medium containing computer code that, when executed by a computer, implements a method for priority buffering of trace data includes receiving instances of trace data, the trace data being generated by events that occur during execution of computer software in the computer; assigning a priority to each instance of trace data, wherein the priority is assigned based on the event that generated the instance of trace data; and inserting the instances of trace data into a plurality of priority buffers based on their respective assigned priorities.

In another aspect, a computing system for priority buffering of trace data includes a priority assignment module configured to receive instances of trace data, the trace data being generated by events that occur during execution of computer software in the computing system, and assign a priority to each instance of trace data, wherein the priority is assigned based on the event that generated the instance of trace data; and a trace queue, the trace queue being located in a computer memory of the computing system, configured to store the instances of trace data in a plurality of priority buffers of the trace queue based on their respective assigned priorities.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 2B illustrates an embodiment of trace data that is generated during execution of computer software stored in a trace queue comprising priority buffers.

DETAILED DESCRIPTION

Figure 1:
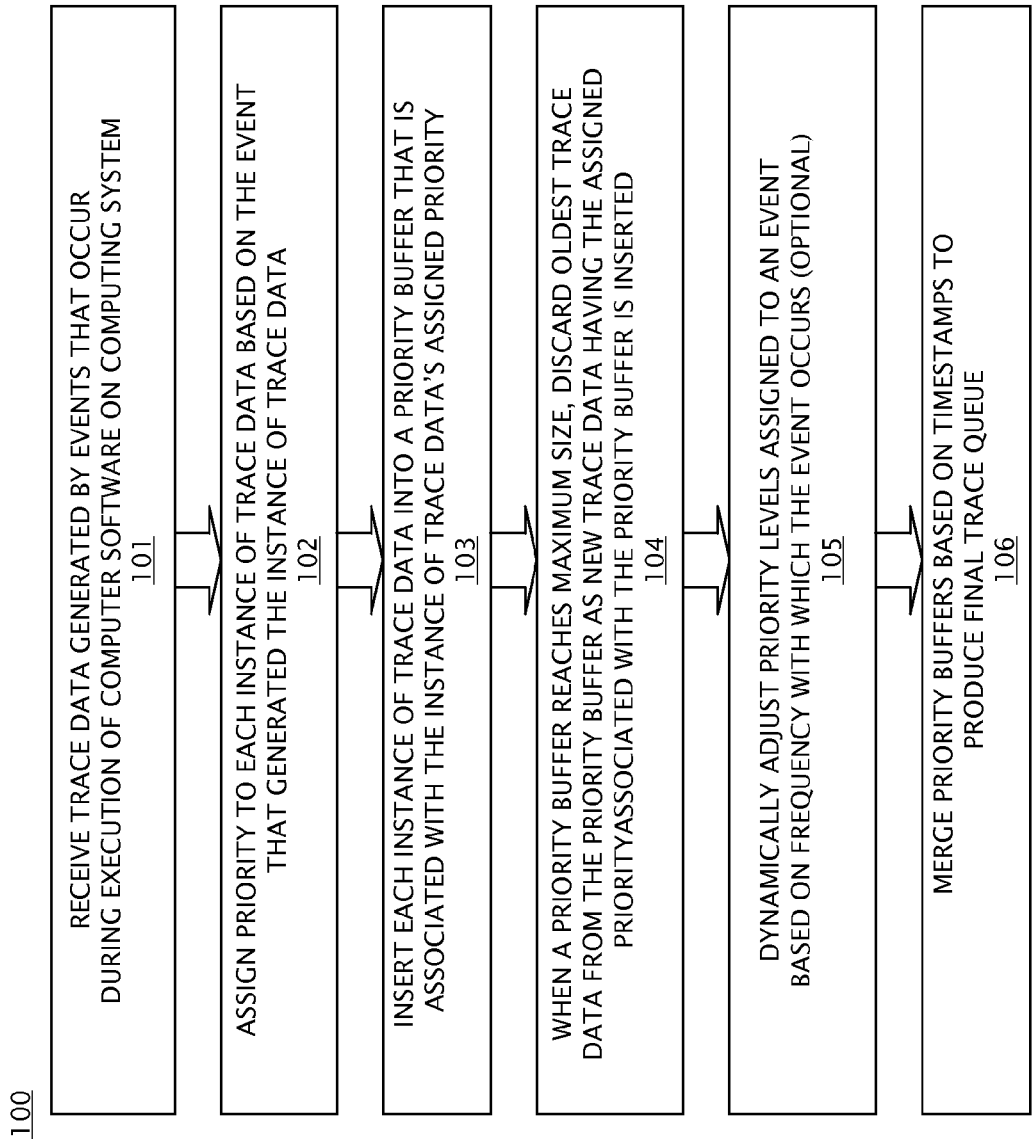
FIG. 1 illustrates a flowchart of an embodiment of a method for priority buffering for trace data.

Embodiments of priority buffering for trace data are provided, with exemplary embodiments being discussed below in detail. Different priority levels are assigned to different instances of trace data that are generated during execution of computer software based on the event that generated the trace data. For example, trace data generated by higher-frequency events may be assigned a lower priority, and trace data generated by lower-frequency events may be assigned a higher priority. The prioritized trace data is stored in a trace queue comprising a plurality of FIFO priority buffers. Each priority buffer corresponds to a respective priority level. When an instance of trace data is generated, it is stored in the priority buffer that corresponds to its assigned priority. When a priority buffer is full, trace data in the priority buffer are discarded according to age, i.e., the oldest trace data in the priority buffer is overwritten. In some embodiments, higher priority trace data is generated at a lower frequency than lower priority trace data, and a priority buffer that holds higher priority trace data will discard trace data at a slower rate than a priority buffer that holds lower priority trace data. This has the effect of removing older details described by the lower priority trace data from the trace queue, while keeping the overall flow described by the higher priority trace data available for examination for a longer time period.

Some examples of events that generate trace data include but are not limited to debugging data, such as exceptions or failures, or entering or leaving subroutines in the computer software. In some embodiments, the higher priority trace data may be generated by errors in the execution of the computer software, and the lower priority trace data may be generated by events that occur during normal execution of the computer software. For instance, trace data generated by entering a subroutine may be assigned a lower priority, and trace data generated by an exception may be assigned a higher priority. In another example, the priority levels may be determined by examining the source code of the computer software, and assigning a higher priority to events that occur in particular portions of the source code of the computer software, such as recently changed code or code that has been problematic. Also, different priorities may be assigned to different branches, or paths, that may be taken during execution of the computer software. If a particular path is known to be problematic, error prone, or seldom executed, trace data generated during execution of the particular path may be assigned a higher priority.

In some embodiments, the priority level assigned to trace data generated by a particular event may be adjusted dynamically during execution of the computer software based on the frequency with which the event occurs during execution of the computer software, so as to ensure that trace data generated by less common events is assigned a higher priority level. The trace data may be monitored during execution of the computer software to determine appropriate priority level adjustments. Priority level adjustment may be performed by examining the patterns of trace data in the priority buffers, determining a trace pattern that includes an error, and automatically increasing the priority of the trace data associated with the trace pattern that includes the error. In such an embodiment, trace patterns seen in the trace queue are stored separately from the trace queue. A trace pattern that is seen more frequently is likely a common and safe trace pattern, and a lower priority may be assigned to trace data associated with the trace pattern. A learning filter may be created to dynamically adjust priority levels.

FIG. 1 shows a flowchart of an embodiment of a method 100 of priority buffering for trace data. In block 101, trace data is generated during execution of computer software on a computing system. The trace data is generated by events that occur during execution of the computer software. In block 102, a priority is assigned to each instance of trace data based on the event that generated the trace data. In some embodiments, priority assignment may be performed such that more frequent events generate lower-priority trace data, and less frequent events generate higher-priority trace data. The priority level may be assigned based on the type of event, or the portion of the computer software in which the event occurred in various embodiments.

Next, in block 103 of method 100, each instance of trace data is inserted in a priority buffer that is associated with the trace data's assigned priority. The priority buffers make up the trace queue that holds data related to the execution of the computer software in the computing system. The number of priority buffers in the trace queue is the same as the number of priority levels. Each priority buffer may be the same size in some embodiments, or in other embodiments, different sizes may be allocated to different priority buffers in the trace queue. For example, a priority buffer for higher priority trace data may be larger than a priority buffer for lower priority trace data so as to ensure that the higher priority trace data is stored in the trace queue for a relatively long period of time.

Flow of method 100 then proceeds to block 104, in which trace data continues to be generated during execution of the computer software. As the trace data is assigned to the various priority buffers based on priority levels, the priority buffers reach their respective maximum sizes. The oldest trace data is discarded from a priority buffer when the priority buffer is full and a new instance of trace data having the priority level associated with the priority buffer is inserted in the priority buffer. In embodiments in which lower-frequency events generate data for the higher-priority buffers, the higher priority trace data in the higher-priority buffers will be stored in the trace queue for a longer time period than trace data related to lower-priority, higher-frequency events. Also, in embodiments in which higher-priority buffers are larger than lower priority buffers, the higher priority trace data in the larger higher-priority buffers will be stored in the trace queue for a longer time period than trace data related to lower-priority, higher-frequency events During further execution of the computer software, in optional block 105 of method 100, the trace data is monitored, and the priority level assigned to trace data generated by a particular event may be adjusted dynamically during execution of the computer software based on the observed frequency with which the particular event occurs during execution of the computer software in some embodiments. In some embodiments, dynamic adjustment of priority levels may be performed to ensure that trace data generated by less frequent events is assigned a higher priority level, and that trace data generated by more frequent events is assigned a lower priority level. A priority level of a particular event may also be adjusted so that the trace data associated with the event is stored in a larger or smaller priority buffer, as appropriate.

Lastly, in block 106, a final trace queue is produced by merging the priority buffers based on time stamps that are included with each individual instance of trace data in the priority buffers. The final trace queue may be examined to determine a source of an error in the computer software.

Figure 2A:
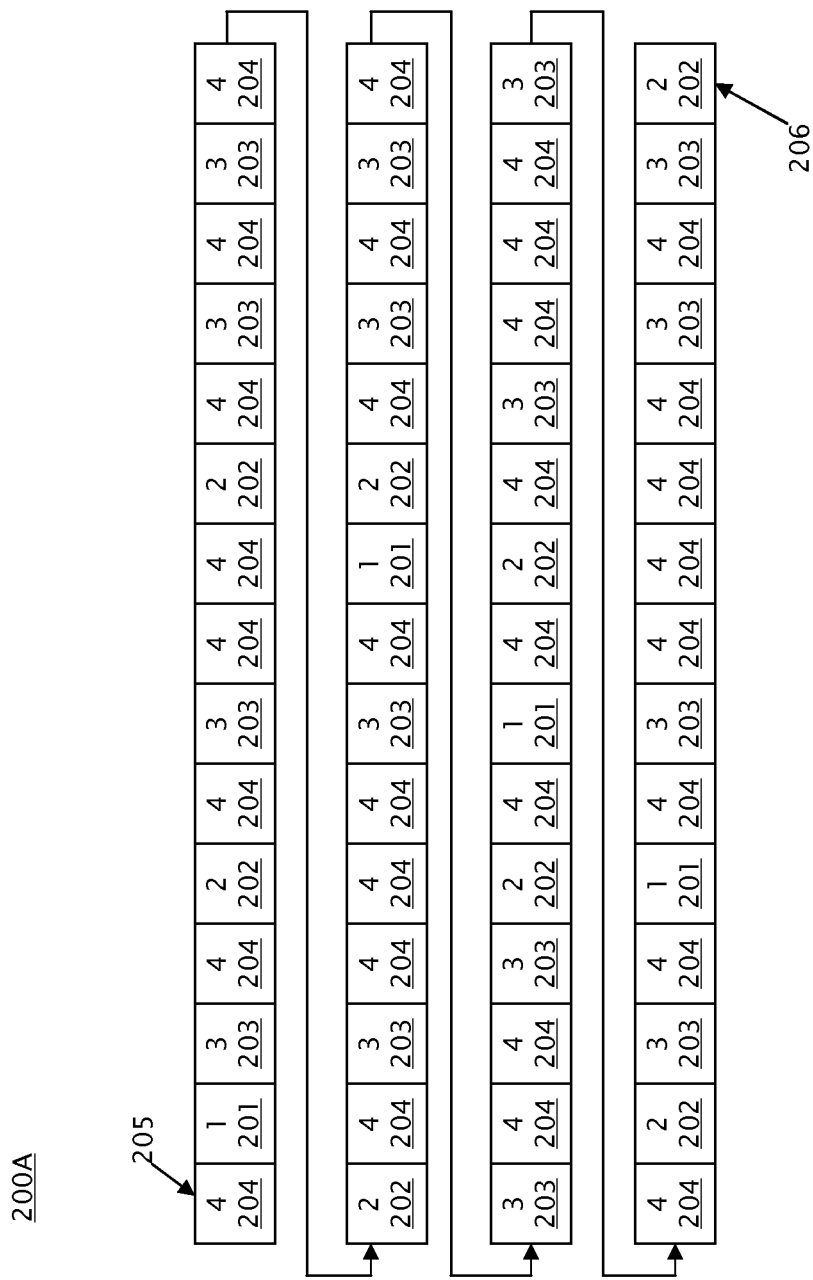
FIG. 2A illustrates an embodiment of trace data that is generated during execution of computer software stored in a trace queue comprising a FIFO buffer.

FIGS. 2A and 2B show examples of trace data generated during execution of computer software. FIGS. 2A-B show trace data having 4 different priority levels (201-204), with 1 (201) being the highest priority and 4 (204) being the lowest priority. In the examples of FIGS. 2A-B, the different priority events have the frequencies listed in Table 1. The unit of time t is an amount of time that it takes for an instance of trace data to be written into the trace queue.

TABLE 1

Frequencies for Different Priority Events in Examples of FIGS. 2A and 2B

| Priority Level | Frequency |
| --- | --- |
| 1 (201) | t/15 |
| 2 (202) | 2t/15 |
| 3 (203) | 4t/15 |
| 4 (204) | 8t/15 |

As shown in FIG. 2A, the trace data is inserted in a trace queue 200A comprising a single FIFO buffer, with a head 205 at which new trace data inserted, and a tail 206 at which the oldest trace data in the queue is located. The trace data located at tail 206 is overwritten as new trace data is inserted at head 205. Trace queue 200A holds 60 instances of trace data, with the entry located at tail 206 being the oldest, having an age of 60t. Due to the frequencies listed above in Table 1, trace queue 200A holds the 4 most recent instances of trace data of priority level 1 (201), the 8 most recent instances of trace data of priority level 2 (202), the 16 most recent instances of trace data of priority level 3 (203), and the 32 most recent instances of trace data of priority level 4 (204) that were generated by the computer software.

Turning to FIG. 2B, a trace queue 200B is shown that includes 4 priority buffers 207, 209, 211, and 213. Priority buffer 207 holds 15 instances of trace data assigned to priority level 1 (201), and has a head 208A and a tail 208B. Priority buffer 209 holds 15 instances of trace data assigned to priority level 2 (202), and has a head 210A and a tail 210B. Priority buffer 211 holds 15 instances of trace data assigned to priority level 3 (203), and has a head 212A and a tail 212B. Priority buffer 213 holds 15 instances of trace data assigned to priority level 4 (204), and has a head 214A and a tail 214B. Trace queue 200B holds 60 instances of trace data; however, the higher priority trace data, which is generated at a lower frequency, is stored for longer. The priority level 1 (201) trace data located at tail 208B of priority buffer 207 has an age of approximately 225t. The priority level 2 (202) trace data located at tail 210B of priority buffer 209 has an age of approximately 225t/2. The priority level 3 (203) trace data located at tail 212B of priority buffer 211 has an age of approximately 225t/4. The priority level 4 (204) trace data located at tail 214B of priority buffer 213 has an age of approximately 225t/8 (therefore, fully detailed trace data is available up to 225t/8). When the final trace queue is needed for examination, the priority buffers 207, 209, 211, and 213 are merged based on timestamps that are included in each instance of trace data. The final trace queue comprises a priority-based trace queue, which includes fully detailed trace data for more recent execution of the computer software along with older, higher priority trace data that may give context to the more detailed recent trace data.

Figure 3:
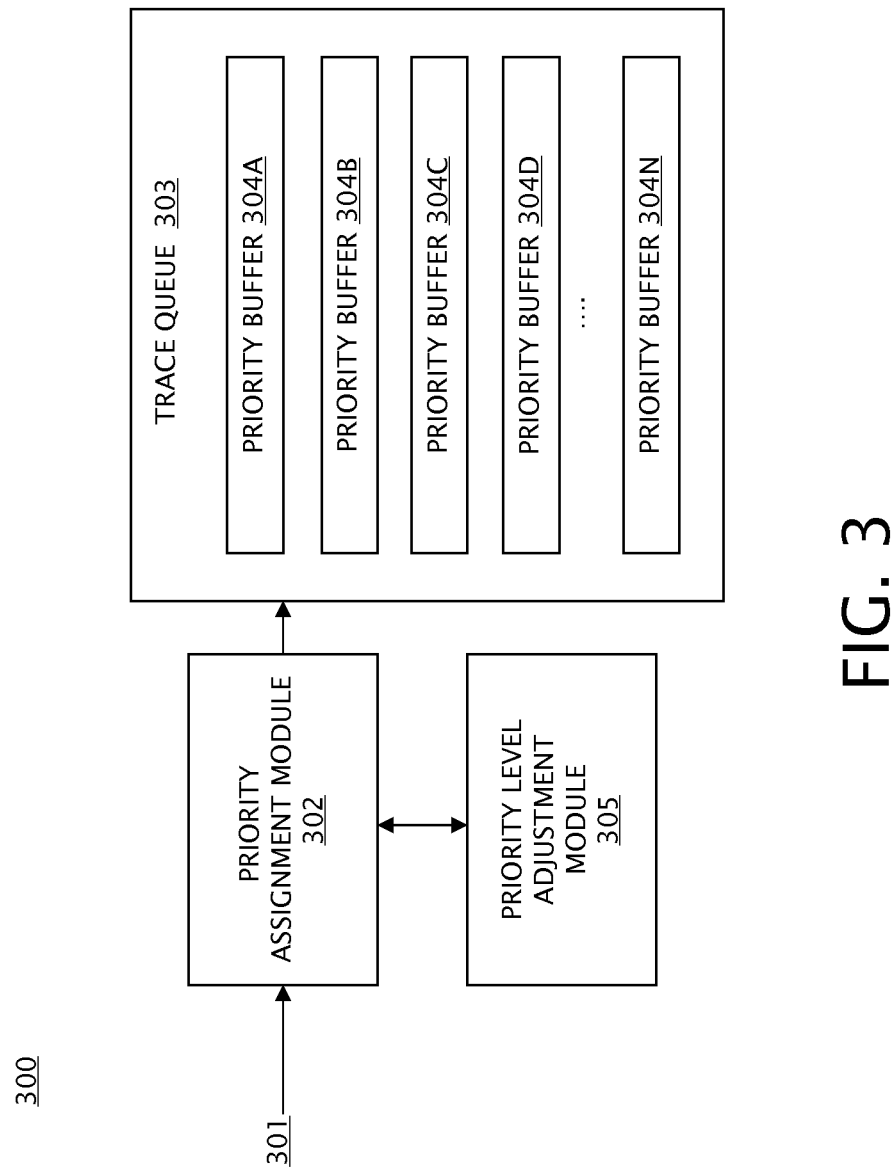
FIG. 3 illustrates a schematic block diagram of an embodiment of a system for priority buffering for trace data.

FIG. 3 shows an embodiment of a system 300 for priority buffering for trace data. Trace data is received on input 301 by priority assignment module 302. Priority assignment module 302 assigns a priority to each instance of trace data based on the trace data's generating event in the computer software. The priority level may be assigned by the priority assignment module 302 based on the type of event, or a portion of the computer software in which the event occurred in various embodiments. The priority assignment module 302 passes the trace data and its associated assigned priority to the trace queue 303, where the trace data is stored in priority buffers 304A-N based on the assigned priorities. Priority level adjustment module 305 monitors the trace data received by priority assignment module 302. In some embodiments, if it is determined that trace data related to a particular event is being generated with a higher than expected frequency, the priority level for that particular event may be lowered. In some embodiments, if it is determined that trace data generated by a particular event is being generated with a lower than expected frequency, the priority level for that particular event may be raised. A priority level of a particular event may also be adjusted so that the trace data associated with the event is stored in a larger or smaller priority buffer, as appropriate. FIG. 3 is shown for illustrative purposes only; a system for priority buffering for trace data may include any appropriate number of priority levels and associated priority buffers, and the priority buffers may each be the same size, or may have different sizes in various embodiments. Also, in some embodiments, priority level adjustment module 305 may be omitted.

Figure 4:
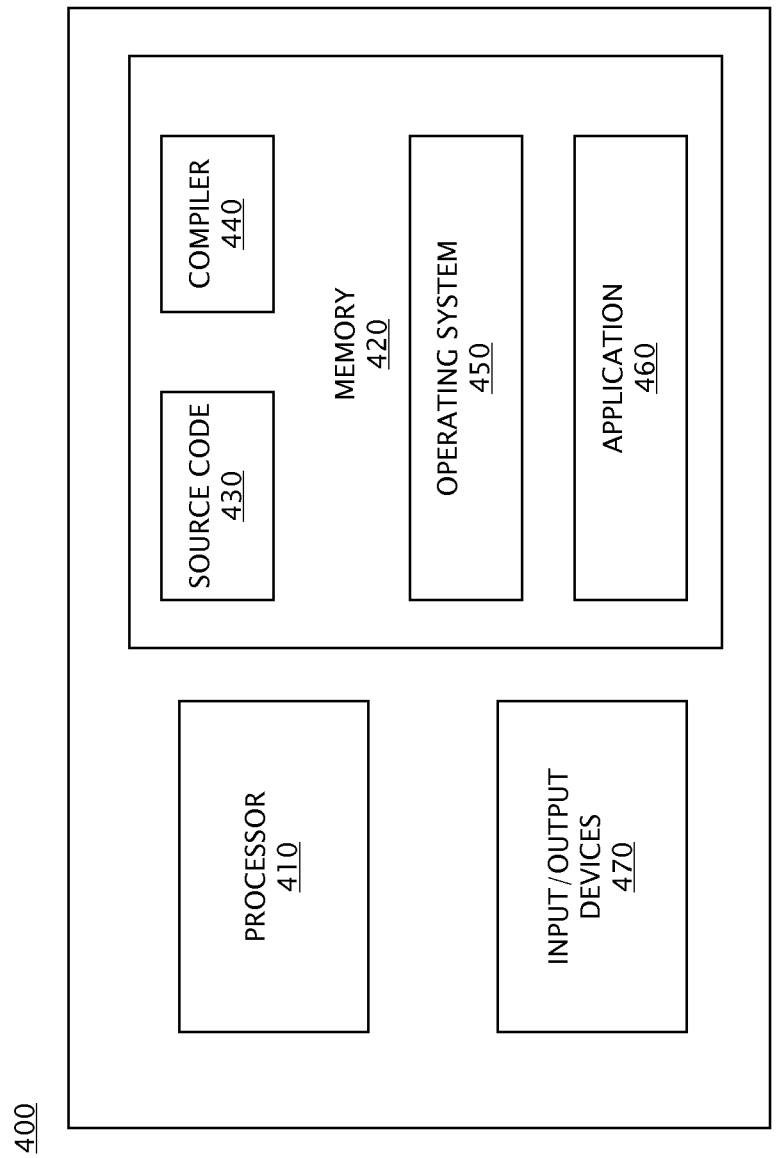
FIG. 4 illustrates an embodiment of a computer that may be used in conjunction with priority buffering for trace data.

FIG. 4 illustrates an example of a computer 400 which may be used in conjunction with priority buffering for trace data. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, smartphones, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include retention of trace data based on priority assignments, giving a configurable long-term view of the behavior of computer software during execution.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for priority buffering of trace data in a computing system, the method comprising:
   receiving instances of trace data by a priority assignment module, the trace data being generated by events that occur during execution of computer software in the computing system;
   assigning a priority to each instance of trace data, wherein the priority is assigned based on the event that generated the instance of trace data;
   inserting the instances of trace data into a plurality of priority buffers based on their respective assigned priorities; and
   dynamically adjusting a priority level of an event based on an observed frequency of the event during execution of the computer software by a priority adjustment module.

2. The method of claim 1, wherein each priority buffer of the plurality of priority buffers corresponds to a respective priority level.

3. The method of claim 1, wherein each priority buffer of the plurality of priority buffers comprises a first-in-first-out (FIFO) buffer.

4. The method of claim 1, wherein the priority is assigned based a frequency of the event that generated the instance of trace data, wherein a lower frequency of the event corresponds to a higher priority assignment, and a higher frequency of the event corresponds to a lower priority assignment.

5. The method of claim 1, wherein the priority is assigned based on a type of the event that generated the instance of trace data.

6. The method of claim 1, wherein the priority is assigned to an instance of trace data based on a portion of the computer software in which the event that generated the instance of trace data occurred, wherein the portion of the computer software comprises recently modified computer code.

7. The method of claim 1, wherein the priority is assigned to an instance of trace data based on a path through the computer software in which the event that generated the instance of trace data occurred, such that an event generated by a first path through the computer software is assigned a different priority than an event generated by a second path through the computer software.

8. The method of claim 1, wherein at least one of the plurality of priority buffers is configured to have a size that is different from another of the plurality of priority buffers.

9. The method of claim 1, further comprising generating a final trace queue by merging the trace data in the plurality of priority buffers based on timestamps associated with the trace data.

10. A computer program product comprising a non-transitory computer readable storage medium containing computer code that, when executed by a computer, implements a method for priority buffering of trace data, wherein the method comprises:
    receiving instances of trace data, the trace data being generated by events that occur during execution of computer software in the computer;
    assigning a priority to each instance of trace data, wherein the priority is assigned based on the event that generated the instance of trace data;
    inserting the instances of trace data into a plurality of priority buffers based on their respective assigned priorities; and
    dynamically adjusting a priority level of an event based on an observed frequency of the event during execution of the computer software.

11. The computer program product according to claim 10, wherein each priority buffer of the plurality of priority buffers corresponds to a respective priority level.

12. The computer program product according to claim 10, wherein each priority buffer of the plurality of priority buffers comprises a first-in-first-out (FIFO) buffer.

13. The computer program product according to claim 10, wherein the priority is assigned based a frequency of the event that generated the instance of trace data, wherein a lower frequency of the event corresponds to a higher priority assignment, and a higher frequency of the event corresponds to a lower priority assignment.

14. The computer program product according to claim 10, wherein the priority is assigned based on a type of the event that generated the instance of trace data.

15. The computer program product according to claim 10, wherein the priority is assigned to an instance of trace data based on a portion of the computer software in which the event that generated the instance of trace data occurred, wherein the portion of the computer software comprises recently modified computer code.

16. The computer program product according to claim 10, wherein the priority is assigned to an instance of trace data based on a path through the computer software in which the event that generated the instance of trace data occurred, such that an event generated by a first path through the computer software is assigned a different priority than an event generated by a second path through the computer software.

17. A computing system for priority buffering of trace data, comprising:
    a priority assignment module configured to receive instances of trace data, the trace data being generated by events that occur during execution of computer software in the computing system, and assign a priority to each instance of trace data, wherein the priority is assigned based on the event that generated the instance of trace data; and
    a trace queue, the trace queue being located in a computer memory of the computing system, configured to store the instances of trace data in a plurality of priority buffers of the trace queue based on their respective assigned priorities; and
    a priority adjustment module configured to dynamically adjust a priority level of an event based on an observed frequency of the event during execution of the computer software.

* * * * *